UNITED STATES PATENT OFFICE.

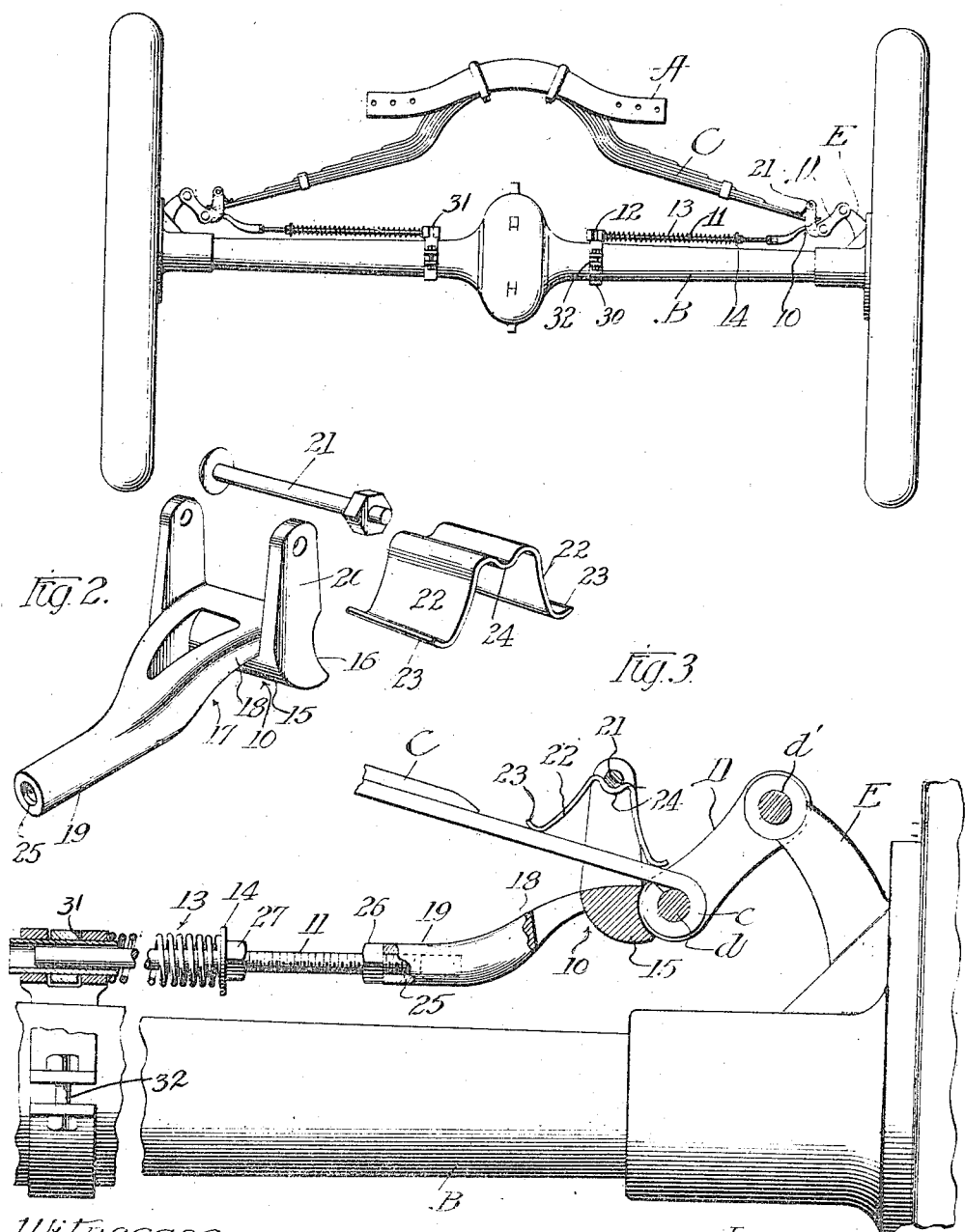

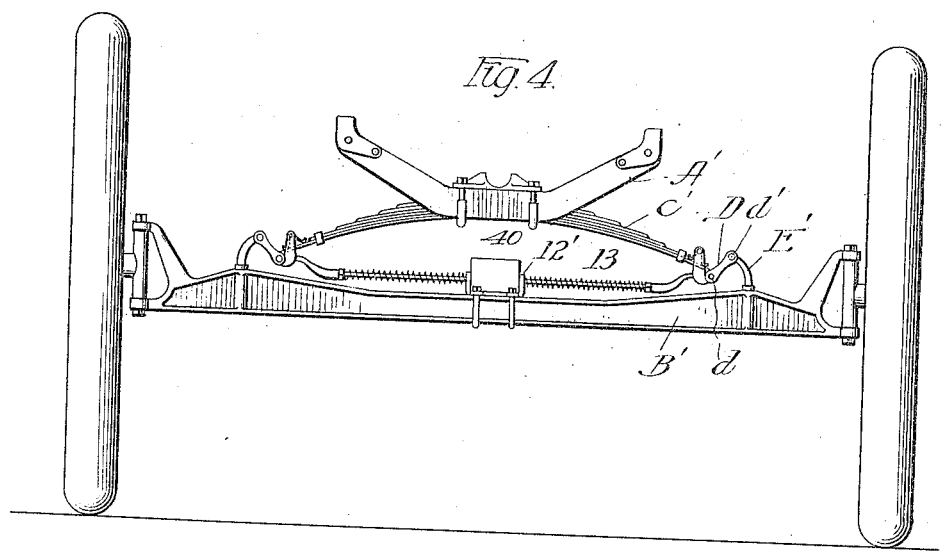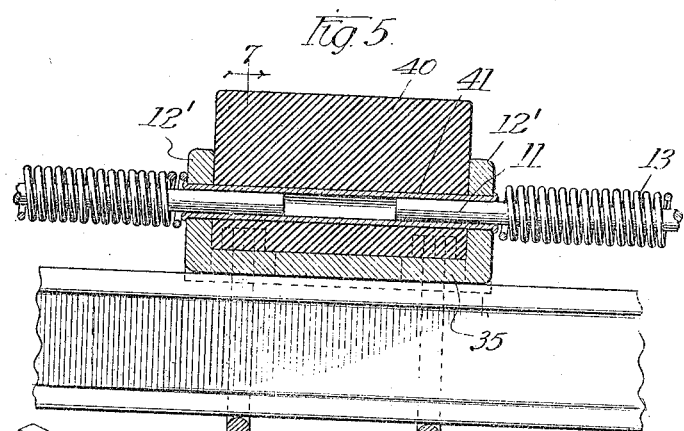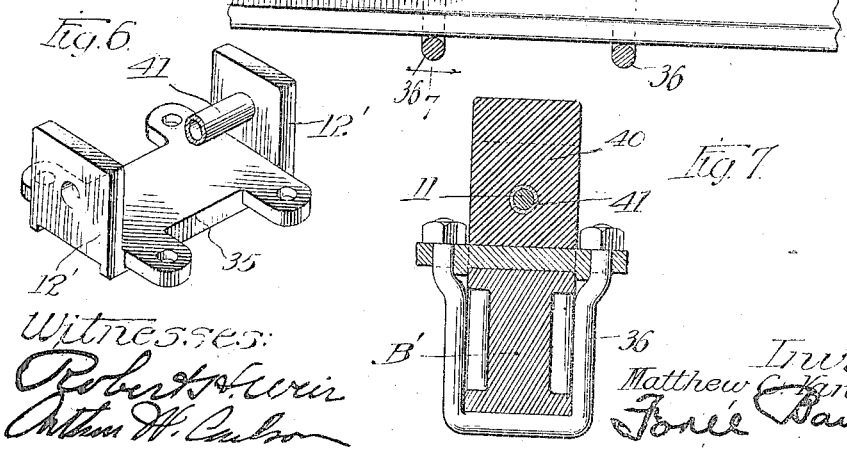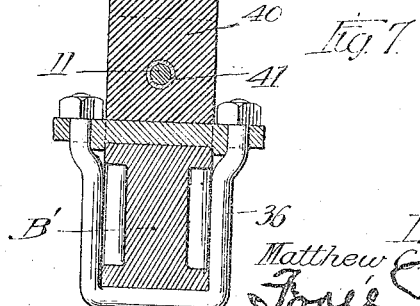

MATTHEW C. VAN ALSTYNE, OF SOUTH HAVEN, MICHIGAN, ASSIGNOR OF ONE-HALF TO GLADSTONE R. BEATTIE AND ONE-HALF TO BENNETT B. McKINSTRY, BOTH OF PAW PAW, MICHIGAN.

RECOIL-CHECK SHOCK-ABSORBER.

1,180,961.        Specification of Letters Patent.     Patented Apr. 25, 1916.

Application filed May 26, 1915. Serial No. 30,485.

*To all whom it may concern:*

Be it known that I, MATTHEW C. VAN ALSTYNE, a citizen of the United States, residing at South Haven, in the county of Van Buren and State of Michigan, have invented certain new and useful Improvements in Recoil-Check Shock-Absorbers, of which the following is a specification.

My invention relates to improvements in recoil-checking shock absorbers for automobiles and the like and has for its general object to provide a simple, inexpensive and efficient recoil-check structure in the form of an attachment, applicable to some automobiles without any change whatever in the automobile structure.

In the drawings wherein I have shown an embodiment of my invention as applied to a "Ford" car, Figure 1 is a rear elevation of portions of the car equipped with a recoil-checking shock absorber embodying my invention; Fig. 2 is an enlarged detail in perspective of certain of the parts in disassociated relation; Fig. 3 is a fragmentary view with parts in section, on an enlarged scale, showing the application of the device in use. Fig. 4 is a front elevation of parts of the car showing the preferred application of my invention to the front springs of the "Ford" car; Fig. 5 is an enlarged sectional view of portions thereof; Fig. 6 is a perspective detail of a guide and socket construction and Fig. 7 is a section on line 7—7 of Fig. 5.

In many makes of automobiles, of which the Ford may be taken as an example, the body frame structure,—represented in the drawings by the rear and front frame members A and A',—is connected to proximate running gear members, such as the rear and front axles B and B', by parti-elliptical leaf springs C and C', of the platform type, the extremities of which are under-slung on links D depending from the appropriate brackets E and E' that are suitably secured to the respective running gear members. In the construction illustrated, wherein each corner of the body is supported by a quarter-elliptic spring, so to speak, paralleling the contiguous axle, a shock tending to cause relative approach between the running gear and frame elongates the span of the parti-elliptic spring member, causing the lower bolt $d$, of the pendant link or shackles D, to move outwardly under the spring stress so that it tends to come more nearly into vertical alinement with the upper or suspending bolt $d'$. On the recoil, of course, the spring C tends to over-throw, so that the bolts $d$—$d$ and $d'$—$d'$ tend to approach each other, or shift inward. Therefore, if an auxiliary spring be caused to work so as to assist outward displacement of the extremities of the main spring C, and to resist inward movement of said extremities, its action will increase the sensitiveness of the spring C to yield under shock, and yet will resist recoil of the body beyond its normal relation to the running gear by resisting the concomitant decrease in the span of the parti-elliptic spring. It is on this principle that my device works.

The particular construction shown provides, for coöperation with each parti-elliptic spring end, a pressure head structure 10, that operates against the inner side of the spring end where it is bent into an eye $c$ at its point of connection with the link D; this pressure head 10 is connected with a rod 11 that extends along and in substantial parallelism with the subjacent axle structure B and that has bearing at its inner end in a suitable guide 12 or 12' fixed to the axle structure, and a coiled spring 13 surrounds said rod 11 and bears between the guide 12 (or 12') and an adjustable abutment 14 on rod 11, so that it acts to press the pressure head 10 outwardly. Thus, the action of spring 13 both augments the responsiveness of spring C to extension of its span and resists any decrease of the span-length of the main spring. In order that this recoil check structure may be attachable to the vehicle without in any way disturbing or changing the vehicle parts, and therefore may be readily applied by one of no especial mechanical skill, the bearing members 12 and 12' are made, respectively, to clamp on the rear and front axles for easy removability, and the pressure heads 10 are constructed for detachable connection with he spring extremities entirely extraneously to any connections between the vehicle parts, so that said head acts exteriorly on the vehicle parts as already assembled. Thus I prefer that each pressure-head member 10 shall consist of a saddle block 15 having its front face 16 convexly curved to coöperate with the undercurved spring end c (or the contiguous surfaces of the link D), said saddle integrally connecting at its upper surface with a body portion 17 which is preferably curved downwardly through shank portion 18 to a stem portion 19 that may, when the device is in position, lie substantially parallel to the axle B. The shank portion 18 is preferably bifurcated where it integrally joins the saddle 15, and tapers in width, while increasing in thickness as it curves down to join the stem 19.

In order to maintain under all conditions proper coöperation between the concaved saddle 15 and the contiguous part of the main spring C, the saddle is provided with upwardly extending projections 20, flanking the side edges of the spring C and preventing side play. While the tension of the spring 13 will effectively hold the saddle in place, I may, for additional certainty, extend the projections 20 well above said spring and cross connect said projections by bolt 21 thereby to form a stirrup that may form an abutment for a suitable positioning spring, the opposite abutment to which is afforded by the vehicle spring C. In the particular construction shown the positioning spring 22 is a flat leaf having its feet 23 adapted to bear on the vehicle spring C and its two limbs converging and connected by a recessed yoke portion 24 that partially surrounds the bolt 21, as best shown in Fig. 3. This positioning spring, while in no way materially decreasing the flexibility of the connection between the parts that is necessary to permit adaptive movement of the saddle 15 on the curved structure on which it bears, very effectively prevents downward displacement of the saddle 15 from its intended position.

The extremity of the stem 19 is interiorly threaded as at 25 to receive the threaded end of thrust rod 11 which is screwed therein and secured in place by lock nut 26, the threaded portion of the rod 11 continuing to accommodate an adjustable nut 27 which acts as an adjusting means for the abutment-washer 14 for recoil-check spring 13.

As to the structural parts thus far specifically described, the attachments at the front and rear of the vehicle may be substantially alike, save that variation in width of the front and rear vehicle springs C' and C may be accommodated by appropriate modification of the width of saddle 15. The parts constituting inner abutments for springs 13 and guides for thrust rods 11, however, are suitably varied to meet the different conditions imposed by the difference in front and rear axle construction. At the rear end of the car of the "Ford" type each bearing 12 takes the form of a bracket collar 30, preferably formed in two pieces pivotally connected, through a tubular hinge 31 and bolted together as at 32 at their free edges, for ready attachability to the axle. The thrust rod 11 extends, preferably, through the tubular hinge as a bearing and the side surface of said hinge affords bearing to the spring 13. The clamping action of the collar, and the complemental tapering of the interfitting surfaces of the collar and axle, securely position each bracket to act as a fixed abutment for the effective exertion of the thrust of its spring 13.

On the front axle the two guides 12'—12' may be upturned ears on a single bracket plate 35 that is secured by U-bolts 36 to the axle B' as best shown in Fig. 7. I prefer that a rubber buffer block 40 be mounted in the bracket construction to project upwardly toward the body, and that it be positioned in the bracket by a tube 41 that is carried in apertures in the guiding ears 12', and that guidingly receives, in separated relation, the proximate ends of the thrust rods 11.

It will be obvious that, with the construction described, as the body and running gear relatively approach the tendency of the vehicle spring to extend is augmented by the pressure of spring 13, but return movement of the vehicle spring to or past normal position is resisted by spring 13. In connection with the front axle it will be observed that should an unusual shock sufficiently raise the axle with respect to the body the buffer 40 will come into action, yieldingly to oppose further approach of the body and axle parts.

While I have herein described my invention, particularly in its application to vehicles having platform parti-elliptic springs, affording for each corner of the vehicle a quarter elliptic spring underslung by a pendant link, my invention in its broader aspects is not dependent on this particular type of vehicle-spring construction and may be applied to other arrangements of parti-elliptic springs.

Having thus described my invention, what I claim is:—

1. A recoil check device for automobiles comprising a bracket for attachment to an automobile member, a head provided at its extremity with a saddle adapted to engage extraneously the extensible extremity of a parti-elliptic vehicle spring structure and an open coil spring interposed between the head and said bracket.

2. The combination with a vehicle comprising a body member and a running gear member and an interposed parti-elliptic spring structure, adapted for elongation of the spring span when the body and running gear members relatively approach, of an extraneous recoil check attachment comprising a guide adapted for attachment to one of the vehicle members, a thrust rod guided therein, a pressure head mounted on said thrust rod adapted and arranged for coaction with the extremity of the parti-elliptic spring, and an expansible spring interposed for action between said pressure head and guide and tending to resist the shortening of the vehicle spring span incident to recoil.

3. The combination of a vehicle comprising a body member and a running gear member, a parti-elliptical spring structure secured to one member and link connected at its ends to the other member, and a spring associated with each link and connected at one end to an end of the parti-elliptical spring and at its other end to the member to which said parti-elliptical spring is link connected, said springs being arranged to assist the movement of said links as the said members relatively approach and resist the opposite movement of said links as the members relatively separate.

4. The combination with a vehicle comprising a body member and a running gear member and an interposed parti-elliptic spring structure adapted for elongation of its span when the body and running gear member is relatively approached, of a guide member carried by one of the vehicle members in vertical alinement with the elliptical spring member, a pressure member slidable in said guide extending in the same vertical plane as the spring member, acting at its free end against the extremity of said spring member, and an expansible spring acting between said pressure member and said guide, to resist shortening of the span of the parti-elliptic spring structure.

5. A recoil check device for automobiles comprising a bracket for attachment to an automobile member, a rod guidedly mounted therein, a spring surrounding said rod and acting against said guide, tending to project said rod from said guide, and a head carried by said rod provided at its extremity with a saddle adapted to engage extraneously the extensible extremity of a parti-elliptic vehicle spring structure.

6. A recoil check device for automobiles comprising a bracket for attachment to an automobile member, a rod guidedly mounted therein, a spring surrounding said rod and acting against said guide, tending to project said rod from said guide, and a head provided at its extremity with a concaved seat and at its side with projecting ears, said seat adapted for engagement with the extensible extremity of the vehicle spring and said ears adapted to straddle such a vehicle spring.

7. The combination with a vehicle comprising a body member, a transverse axle, a parti-elliptic platform spring structure in vertical alinement with said axle, and links connecting the spring extremities with axle carried supports, having a bracket detachably connected with the axle, a rod guided in said bracket, a spring surrounding said rod and acting against the bracket to project the rod, a pressure head on said rod provided with a seat for coöperation with the extremity of the vehicle spring, ears projecting from said head, straddling the vehicle spring, and a positioning spring interposed between the vehicle spring and said ears to maintain said head in proper association with the vehicle spring.

In testimony whereof I hereunto set my hand in the presence of two subscribing witnesses.

MATTHEW C. VAN ALSTYNE.

In the presence of—
STANLEY W. COOK,
MARY F. ALLEN.